US012784948B2

(12) United States Patent
Xu et al.

(10) Patent No.: US 12,784,948 B2
(45) **Date of Patent: *Nov. 3, 2026**

(54) R-Fe-B SINTERED MAGNET, PREPARATION METHOD AND USE THEREOF

(71) Applicants: YANTAI ZHENGHAI MAGNETIC MATERIAL CO., LTD., Yantai (CN); NANTONG ZHENGHAI MAGNET CO., LTD., Nantong (CN)

(72) Inventors: Zhaopu Xu, Yantai (CN); Dongdong Li, Yantai (CN); Guodong Su, Yantai (CN); Weiwei Bu, Yantai (CN)

(73) Assignees: YANTAI ZHENGHAI MAGNETIC MATERIAL CO., LTD., Yantai (CN); NANTONG ZHENGHAI MAGNET CO., LTD., Nantong (CN)

( * ) Notice: Subject to any disclaimer, the term of this patent is extended or adjusted under 35 U.S.C. 154(b) by 231 days.

This patent is subject to a terminal disclaimer.

(21) Appl. No.: 18/574,347

(22) PCT Filed: Jun. 23, 2022

(86) PCT No.: PCT/CN2022/100829
§ 371 (c)(1),
(2) Date: Dec. 27, 2023

(87) PCT Pub. No.: WO2023/274034
PCT Pub. Date: Jan. 5, 2023

(65) Prior Publication Data

US 2024/0321489 A1 Sep. 26, 2024

(30) Foreign Application Priority Data

Jun. 28, 2021 (CN) ........................ 202110723269.2

(51) Int. Cl.
*H01F 1/057* (2006.01)
*C21D 1/18* (2006.01)
(Continued)

(52) U.S. Cl.
CPC ............ *H01F 1/0577* (2013.01); *C21D 1/18* (2013.01); *C21D 6/007* (2013.01); *C21D 9/46* (2013.01);
(Continued)

(58) Field of Classification Search
CPC .. C21D 1/18; C21D 6/007; C21D 9/46; C22C 2202/02; C22C 38/002; C22C 38/005;
(Continued)

(56) References Cited

U.S. PATENT DOCUMENTS 8,038,807 B2 * 10/2011 Morimoto ............ H01F 1/0577 148/101
2017/0330659 A1 11/2017 Mino
(Continued)

FOREIGN PATENT DOCUMENTS

CN 101375352 A 2/2009
CN 100565719 C 12/2009
(Continued)

OTHER PUBLICATIONS

English Machine Translation: CN 109411173.*
English Machine Translation: CN 115116728.*

*Primary Examiner* — Holly Rickman
*Assistant Examiner* — Linda N Chau
(74) *Attorney, Agent, or Firm* — NKL Law; Allen Xue

(57) ABSTRACT

An R—Fe—B sintered magnet, and a preparation method therefor and use thereof are provided. The surface of the R—Fe—B sintered magnet has an oxide adhesive layer, and is obtained by means of the heat preservation and heat treatment of an R—Fe—B magnet having a composite
(Continued)

diffusion layer on the surface thereof. The heat treatment comprises alternately carrying out a low-temperature heat treatment at 750° C.-830° C. and a high-temperature heat treatment at 830° C.-970° C., and a neodymium iron boron green body having the oxide adhesive layer on the surface thereof is obtained. The grain boundary diffusion of the R—Fe—B magnet is optimized, and the coercive force distribution of the magnet is improved. The R—Fe—B sintered magnet can be used in the field of automobiles, wind power generation, household electric motors, medical apparatuses or mobile communication appliances.

13 Claims, 1 Drawing Sheet

(51) Int. Cl.

| | |
|---|---|
| ***C21D 6/00*** | (2006.01) |
| ***C21D 9/46*** | (2006.01) |
| ***C22C 38/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |
| ***H01F 41/02*** | (2006.01) |
| ***H02K 1/02*** | (2006.01) |

(52) U.S. Cl.

CPC .......... *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *H01F 41/0253* (2013.01); *H02K 1/02* (2013.01); *C22C 2202/02* (2013.01)

(58) Field of Classification Search

CPC ......... C22C 38/06; C22C 38/10; C22C 38/14; C22C 38/16; H01F 1/0577; H01F 41/0253; H01F 41/026; H01F 41/0293

See application file for complete search history.

(56) References Cited

U.S. PATENT DOCUMENTS

| | | | |
|---|---|---|---|
| 2019/0311850 | A1 | 10/2019 | Siess et al. |
| 2021/0166870 | A1 | 6/2021 | Wang et al. |

FOREIGN PATENT DOCUMENTS

| | | | |
|---|---|---|---|
| CN | 101651038 | B | 6/2012 |
| CN | 101404195 | B | 6/2013 |
| CN | 103295713 | A | 9/2013 |
| CN | 106158347 | A | 11/2016 |
| CN | 107004500 | A | 8/2017 |
| CN | 109411173 | A | 3/2019 |
| CN | 110211797 | A | 9/2019 |
| CN | 110459397 | A | 11/2019 |
| CN | 111326307 | A | 6/2020 |
| EP | 3822996 | A1 | 5/2021 |
| JP | 2011233554 | A | 11/2011 |
| JP | 2016082176 | A | 5/2016 |
| JP | 2017055074 | A | 3/2017 |

* cited by examiner

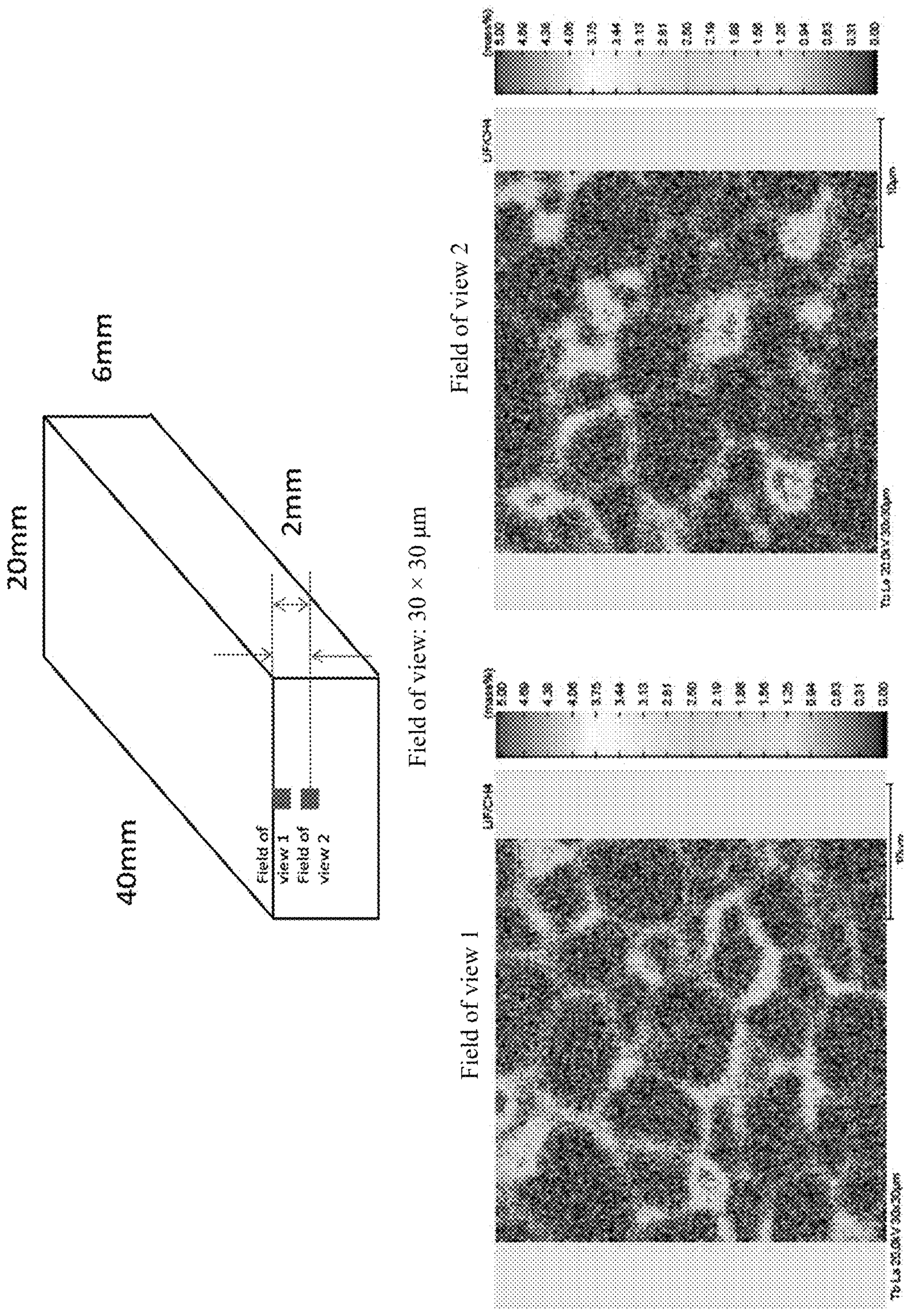
Field of view: 30 × 30 µm

R-Fe-B SINTERED MAGNET, PREPARATION METHOD AND USE THEREOF

CROSS-REFERENCE TO RELATED APPLICATIONS

This application is a U.S. national stage entry of PCT International Application No. PCT/CN2022/100829, filed on Jun. 23, 2022, which claims the priority to the Chinese patent application No. 202110723269.2 and entitled "R—FE—B SINTERED MAGNET, PREPARATION METHOD AND USE THEREOF" filed to the China National Intellectual Property Administration on Jun. 28, 2021, the content of which is incorporated herein by reference in its entirety.

TECHNICAL FIELD

The present disclosure relates to the field of rare earth permanent magnet materials, and particularly, to a sintered R—Fe—B magnet, preparation method and use thereof.

BACKGROUND

R—Fe—B magnets have been widely used in the fields of wind power generation, household motors, medical equipment, mobile communication, and the like due to their superior performance. Especially due to the recent low carbonization of global automotive technologies, the quantity of new energy automobiles in China has been the highest in the world. It is predicted that high-end neodymium-iron-boron permanent magnet materials will usher in rapid growth in the next 10-15 years, and market application of sintered neodymium-iron-boron will be further expanded.

Coercivity of R—Fe—B magnets is a decisive factor for magnetic magnitude and retention time of permanent magnet materials. In traditional processes, coercivity is mainly increased by directly adding heavy rare earth elements Dy and Tb to a smelting furnace, but the amount of heavy rare earth used is relatively large, and the coercivity is increased in this way at the expense of remanence, and the remanence of magnets decreases obviously with an increase in the coercivity. Moreover, heavy rare earth elements are expensive due to their rarity, resulting in a sharp increase in the cost of magnets. In the field of R—Fe—B, a grain boundary diffusion process has been used in mass production, in which a grain boundary microstructure is improved by diffusing heavy rare earth elements such as Dy or Tb from the surface of a magnet into the interior of the magnet along a grain boundary, thereby increasing the coercivity of the sintered Nd—Fe—B magnet, effectively reducing a scattered field at the grain boundary, weakening a magnetic exchange coupling effect, and magnetically hardening the grain boundary, and the coercivity is greatly increased with basically no decrease in the remanence of the magnet. Current methods for achieving grain boundary diffusion mainly include evaporation coating, arc ion plating, magnetron sputtering, roll coating, and the like (with reference to patent document 1, patent document 2, patent document 3, patent document 4, and patent document 5). In the way described above, different methods and devices are used to dispose heavy rare earth on the surfaces of magnets. In patent document 5, the applicant achieves an effect of disposing heavy rare earth elements on the surface of the magnet by disposing an organic layer containing heavy rare earth elements on the surface of the magnet. In this way, the heavy rare earth layer is highly controllable in thickness and homogeneity, is not easy to fall off, and is easy for mass production. In addition, the heavy rare earth powder is wrapped by an organic substance and placed in the air so as not to be easily oxidized, the organic substance is separated from the magnet during heat treatment, and the heavy rare earth elements diffuse into the interior of the magnet along the grain boundary.

The grain boundary diffusion technology increases Hcj by diffusing heavy rare earth disposed on the surface of a magnet into the interior of the magnet along a grain boundary, in which the concentration difference of heavy rare earth between the surface and the interior of the magnet drives the diffusion.

For a magnet with a relatively small thickness, heavy rare earth is easy to diffuse to a central part of the magnet, and the distribution of Hcj on the surface and in the interior of the magnet is more uniform.

However, as the thickness of the magnet increases, the difference in Hcj between the surface and the interior of the magnet is obviously increased by simply disposing more heavy rare earth on the surface of the magnet. Moreover, on one hand, the high heavy rare earth layer disposed on the surface will destroy the surface state of the magnet, so that subsequent processing is needed; on the other hand, more heavy rare earth on the surface is easy to diffuse into the interior of grains, so that the remanence on the surface of the magnet obviously decreases, and the effect of grain boundary diffusion is reduced.

In contrast to the development of various devices and methods for disposing heavy rare earth on surfaces of magnets, for a magnet with a relatively large product thickness, the improvement of the diffusion depth and the consistency of Hcj between the surface and the interior of the magnet after diffusion has become an urgent problem to be resolved at present.

Patent documents related to the prior art described above are as follows:

patent document 1: CN101651038B;
patent document 2: CN101375352A;
patent document 3: CN100565719C;
patent document 4: CN101404195B; and
patent document 5: CN106158347A.

SUMMARY

To improve the technical problem described above, the present disclosure provides an R—Fe—B magnet blank, wherein the R—Fe—B magnet blank comprises an R—Fe—B magnet and a composite diffusion layer, the composite diffusion layer being disposed on the surface of the R—Fe—B magnet.

According to an embodiment of the present disclosure, a thickness in an orientation direction of the R—Fe—B magnet is Z, and Z is greater than or equal to 3.95 mm. Preferably, Z is not less than 3.95 mm and not greater than 15.05 mm. Preferably, a dimensional tolerance of Z is ±0.05 mm, for example, ±0.03 mm.

According to an embodiment of the present disclosure, in the R—Fe—B magnet, R is selected from any one or more of rare earth elements Nd, Pr, Tb, Dy, Gd and Ho.

According to an embodiment of the present disclosure, in the R—Fe—B magnet, R preferably has a content of 27 wt %-34 wt %, for example, 27 wt %-30 wt %.

According to an embodiment of the present disclosure, in the R—Fe—B magnet, B preferably has a content of 0.8-1.3 wt %.

According to an embodiment of the present disclosure, the R—Fe—B magnet further comprises Fe and M, wherein M is selected from at least one of Ti, V, Cr, Mn, Co, Ga, Cu, Si, Al, Zr, Nb, W, and Mo.

According to an embodiment of the present disclosure, in the R—Fe—B magnet, M may have a content of 0 wt %-5 wt %, preferably 0 wt %-3 wt %, for example, 2 wt %.

According to an embodiment of the present disclosure, the composite diffusion layer has a total thickness of less than 200 μm, for example, 10 μm-180 μm, such as 50 μm, 80 μm, 100 μm, or 150 μm.

According to an embodiment of the present disclosure, the composite diffusion layer comprises a heavy rare earth element, and preferably comprises a heavy rare earth element, a metal oxide, an organic solid, and optionally a solvent present or absent.

According to an embodiment of the present disclosure, the heavy rare earth element is selected from at least one of metal dysprosium, metal terbium, dysprosium hydride, terbium hydride, dysprosium fluoride, terbium fluoride, dysprosium oxide, and terbium oxide.

According to an embodiment of the present disclosure, the metal oxide is selected from at least one of zirconium oxide, calcium oxide, aluminum oxide, and holmium oxide.

According to an embodiment of the present disclosure, the metal oxide may be in the form of a powder.

For example, the metal oxide has a granularity selected from 0.5 μm-10 μm. Preferably, in the metal oxide, a metal oxide powder with a granularity of 0.5 μm-3 μm has a mass percentage of not less than 70%.

According to an embodiment of the present disclosure, the organic solid may be in the form of a powder, for example, the organic solid is selected from at least one of rosin-modified alkyd resin, thermoplastic phenolic resin, urea-formaldehyde resin, and polyvinyl butyral.

According to an embodiment of the present disclosure, the solvent is selected from at least one of an alcohol solvent (e.g., methanol or ethanol), an ether solvent (e.g., diethyl ether), and an aromatic hydrocarbon solvent (e.g., benzene), preferably an alcohol solvent, such as ethanol.

According to an embodiment of the present disclosure, the composite diffusion layer comprises an RH layer and an RL layer, wherein

- the RH layer comprises a heavy rare earth, an organic solid, and optionally a solvent present or absent; and
- the RL layer comprises a metal oxide, an organic solid, and optionally a solvent present or absent.

According to an embodiment of the present disclosure, the number of each of the RH layer and the RL layer is independently at least 1, for example, selected from 1, 2, 3, 4, 5, or more.

According to an embodiment of the present disclosure, the RH layer and the RL layer are alternately disposed in sequence. Preferably, when the RH layer and the RL layer are alternately disposed, an outer layer far from the surface of the R—Fe—B magnet is preferably the RL layer.

According to an embodiment of the present disclosure, the RH layer has a single-layer thickness selected from 0.5 μm-40 μm, and illustratively, the RH layer has a thickness of 20±5 μm or 25±5 μm.

According to an embodiment of the present disclosure, the RL layer has a single-layer thickness selected from 0.5 μm-15 μm, and illustratively, the RL layer has a thickness of 3±2 μm.

According to an embodiment of the present disclosure, the weight of the composite diffusion layer is 0.1 wt %-3 wt %, such as 0.9 wt % or 1.2 wt %, of the weight of the R—Fe—B magnet.

The present disclosure further provides a sintered R—Fe—B magnet, wherein the sintered R—Fe—B magnet is obtained by subjecting the R—Fe—B magnet blank described above to a temperature holding heat treatment; and after the composite diffusion layer is subjected to the temperature holding heat treatment, the metal oxide therein forms an oxide adhesive layer.

According to an embodiment of the present disclosure,

- the surface of the sintered R—Fe—B magnet has an oxide adhesive layer; and
- Hcj on the surface of the sintered R—Fe—B magnet in an orientation direction of the magnet is H1, Hcj from the surface of the magnet along the orientation direction of the magnet to a position 2.00±0.02 mm inside the magnet is H2, and the H1 and the H2 have a relationship as shown in formula (I)

$$H1 - H2 \leq 50\ kA/m \tag{I}$$

According to an embodiment of the present disclosure, the oxide adhesive layer has a thickness of less than 20 μm, preferably less than or equal to 10 μm, for example, 5 μm.

Preferably, the oxide adhesive layer comprises at least one of zirconium oxide, calcium oxide, aluminum oxide, and holmium oxide.

According to an embodiment of the present disclosure, the sintered R—Fe—B magnet comprises at least one of R, B, Fe, and M having the definitions and contents as described above.

According to an embodiment of the present disclosure, the temperature holding heat treatment comprises alternately performing a low-temperature heat treatment and a high-temperature heat treatment.

Preferably, the low-temperature heat treatment has a temperature range of 750° C.-830° C.

Preferably, the high-temperature heat treatment has a temperature range of 830° C.-970° C.

According to an embodiment of the present disclosure, the oxide adhesive layer can be removed by means of non-mechanical grinding, for example, completely removed by means of brushing, ultrasonic treatment, or the like.

The present disclosure further provides a preparation method of a sintered R—Fe—B magnet, preferably a preparation method of the sintered R—Fe—B magnet as described above, wherein the preparation method comprises the following steps:

(1) disposing a composite diffusion layer on the surface of an R—Fe—B magnet by coating to form the R—Fe—B magnet blank described above; and (2) performing a temperature holding heat treatment on the R—Fe—B magnet blank in vacuum or in an inert gas atmosphere to obtain a sintered magnet having an oxide adhesive layer on the surface thereof; preferably, the temperature holding heat treatment comprises alternately performing a low-temperature heat treatment and a high-temperature heat treatment, wherein the low-temperature heat treatment has a temperature range of 750° C.-830° C., and the high-temperature heat treatment has a temperature range of 830° C.-970° C.

According to an embodiment of the present disclosure, the preparation method improves the distribution of coercivity of the magnet by optimizing grain boundary diffusion.

According to an embodiment of the present disclosure, the low-temperature heat treatment may be a low-temperature diffusion temperature holding heat treatment, and the high-temperature heat treatment may be a high-temperature diffusion temperature holding heat treatment. Illustratively, the temperature holding heat treatment comprises a first low-temperature diffusion temperature holding heat treatment, a first high-temperature diffusion temperature holding heat treatment, a second low-temperature diffusion temperature holding heat treatment, and a second high-temperature diffusion temperature holding heat treatment.

According to an embodiment of the present disclosure, the total time for the temperature holding heat treatment is more than or equal to 8 h, wherein the time for the low-temperature heat treatment and the time for the high-temperature heat treatment are the same or different. For example, the time for the low-temperature heat treatment is less than or equal to 5 h, and the time for the high-temperature heat treatment is less than or equal to 5 h.

Preferably, heating is also required from the low-temperature heat treatment to the high-temperature heat treatment, with a heating rate of 4° C./min-10° C./min.

Preferably, cooling is also required from the high-temperature heat treatment to the low-temperature heat treatment. The cooling is performed by using a vacuum cooling process without heating power output.

According to an embodiment of the present disclosure, the method further comprises performing an aging heat treatment after the temperature holding heat treatment. In the present disclosure, the aging heat treatment refers to a heat treatment process in which alloy workpieces, after solution treatment, cold plastic formation or casting and forging, are placed at a high temperature or kept at room temperature to maintain the variation in performance, shape and size over time.

According to an embodiment of the present disclosure, the aging heat treatment comprises quenching to room temperature after the temperature holding heat treatment, then heating to 430° C.-650° C. for an aging treatment, and quenching to room temperature after holding the temperature for 1 h-72 h.

Illustratively, the aging heat treatment comprises quenching to room temperature after the temperature holding heat treatment, then heating to 500° C. for an aging treatment, and quenching to room temperature after holding the temperature for 4 h.

According to an embodiment of the present disclosure, the disposing the composite diffusion layer by coating comprises coating the surface of the R—Fe—B magnet with a slurry, and then drying to form the composite diffusion layer.

According to an embodiment of the present disclosure, the drying can be achieved by using a drying device known in the art, such as a vacuum drying oven, an air-blast drying oven, or the like. The temperature and time for the drying are not specified as long as a solvent in the slurry can be dried. As an example, the temperature for the drying is 35° C.-100° C., and the time for the drying is 5 s-600 s.

According to an embodiment of the present disclosure, the coating can be performed by at least one of coating methods such as brush coating, roll coating, dipping, spray coating, and the like. For example, for a regular-shaped square magnet, a composite diffusion layer is preferably formed on the surface of the magnet by using a coating method such as brush coating, roll coating, or the like, and for an irregular-shaped R—Fe—B magnet, a composite diffusion layer is preferably formed on the surface of the R—Fe—B magnet by using a coating method such as dipping, spray coating, or the like. Illustratively, when the coating method of dipping is used, the R—Fe—B magnet is completely immersed in the slurry for dipping, for example, for 1 s-10 s, such as 3 s-5 s.

According to an embodiment of the present disclosure, after the drying, the weight of the R—Fe—B magnet blank is increased by 0.1 wt %-3 wt %, such as 0.9 wt % or 1.2 wt %, compared with that of the R—Fe—B magnet.

According to an embodiment of the present disclosure, the slurry has a solid content of 30 wt %-90 wt %, preferably 40 wt %-60 wt %.

According to an embodiment of the present disclosure, the slurry is selected from an RH layer slurry and/or an RL layer slurry.

According to an embodiment of the present disclosure, the RH layer slurry comprises a heavy rare earth element, an organic solid, and a solvent. Preferably, the heavy rare earth element, the organic solid, and the solvent are in a mass ratio of (40-70):(3-10):(20-50), for example, 60:5:35 or 55:5:40.

According to an embodiment of the present disclosure, the RL layer slurry comprises a metal oxide, an organic solid, and a solvent. Preferably, the metal oxide, the organic solid, and the solvent are in a mass ratio of (30-70):(3-10):(20-50), for example, 55:5:40 or 50:6:44.

Preferably, the metal oxide, the heavy rare earth element, the organic solid, and the solvent have the meanings as described above.

Preferably, a method for preparing the slurry comprises: adding the metal oxide, the heavy rare earth element, or the organic solid to the solvent, and stirring to form a homogeneous slurry. Preferably, the amounts of the metal oxide, the heavy rare earth element, the organic solid, and the solvent used are not specifically required in the present disclosure, and can be determined according to performance of the sintered R—Fe—B magnet. Preferably, conditions for the stirring are not specified in the present disclosure, and any stirring method capable of forming a homogeneous slurry is applicable to the present disclosure. For example, the stirring is performed by using a conventional stirring method in the art, and the time for the stirring may be 20 min, 30 min, 40 min, 50 min, 60 min, 70 min, 80 min, 90 min, or a range between any two of the values described above.

Illustratively, the slurry is selected from an RH layer slurry and an RL layer slurry.

In a specific embodiment, the RL layer slurry comprises 55 wt % zirconium oxide, 5 wt % rosin-modified alkyd resin, and 40 wt % ethanol; and the RH layer slurry comprises 60 wt % terbium fluoride, 5 wt % rosin-modified alkyd resin, and 35 wt % ethanol.

In another specific embodiment, the RL layer slurry comprises 50 wt % aluminum oxide, 6 wt % rosin-modified alkyd resin, and 44 wt % ethanol; and the RH layer slurry comprises 55 wt % terbium fluoride, 5 wt % rosin-modified alkyd resin, and 40 wt % ethanol.

According to an embodiment of the present disclosure, the coating further comprises coating the surface of the R—Fe—B magnet several times with the slurry.

Preferably, the coating is performed at least twice, for example, 3 times, 4 times, or 5 times.

According to an embodiment of the present disclosure, when the coating with the slurry is performed several times, the slurry may be the same or different, preferably different.

Preferably, when the coating with the slurry is performed several times, the composite diffusion layer is alternately coated with the RH layer slurry and the RL layer slurry.

Preferably, for the last coating, the slurry is selected from the RL layer slurry.

According to an embodiment of the present disclosure, the composite diffusion layer after drying is formed by alternately disposing the RH layer and the RL layer.

Preferably, in the composite diffusion layer after drying, a single coating of the RH layer has a thickness of 0.5 μm-40 μm, for example, 0.5 μm, 1 μm, 5 μm, 10 μm, 15 μm, 20 μm, 30 μm, or a range between any two of the values described above.

Preferably, in the composite diffusion layer after drying, a single coating of the RL layer has a thickness of 0.5 μm-15 μm, for example, 0.5 μm, 1 μm, 3 μm, 5 μm, 7 μm, 10 am, 15 am, or a range between any two of the values described above.

According to an embodiment of the present disclosure, before coating with the slurry, the R—Fe—B magnet may be further washed with an acid solution and deionized water in sequence, and then dried.

The acid solution may be selected from an acid solution known in the art, such as an aqueous hydrogen chloride solution, an aqueous nitric acid solution, and the like.

According to an embodiment of the present disclosure, the temperature holding heat treatment or the aging heat treatment is performed in vacuum or in an inert gas atmosphere. For example, the inert gas is selected from nitrogen, argon, and the like.

According to an embodiment of the present disclosure, the R—Fe—B magnet blank is in a contact arrangement during the temperature holding heat treatment, so that space saving can be achieved.

The present disclosure further provides use of the sintered R—Fe—B magnet described above in the fields of automobiles, wind power generation, household motors, medical equipment, or mobile communication devices, preferably in the field of new energy automobiles.

The present disclosure further provides a motor, wherein the motor comprises the sintered R—Fe—B magnet described above.

Preferably, the motor comprises a power output motor, a steering EPS motor, and a micro motor.

Preferably, the micro motor comprises an electric water pump motor, a fog lamp motor for steering linkage, a skylight motor, an air conditioner motor, a wiper motor, and the like.

Beneficial Effects

The present disclosure provides a sintered R—Fe—B magnet and a method for manufacturing same. By alternately disposing composite diffusion layers containing heavy rare earth RH and metal oxide powder RL on the surface of the R—Fe—B magnet, the structure of the heavy rare earth layer disposed on the surface is improved, grain boundary diffusion of the R—Fe—B magnet is optimized, and distribution uniformity of coercivity of the magnet is improved. Compared with the patent CN106158347A, in this patent, the distribution of heavy rare earth RH on the surface of the magnet is improved by alternately adding RL layers. During diffusion, specific RL layers effectively reduce the concentration difference of heavy rare earth between the RH layers and the interior of the magnet during diffusion, thereby reducing the driving force for diffusion of heavy rare earth from the surface of the magnet to the interior of the magnet during grain boundary diffusion. Meanwhile, at the grain boundary diffusion stage, the diffusion speed and concentration of heavy rare earth are regulated and controlled by means of alternate high-temperature and low-temperature holding, which optimizes the problems that the distribution uniformity of Hcj inside a diffusion magnet with a large thickness is poor, and heavy rare earth is concentrated on the surface of the magnet and is not easy to diffuse into the center of the magnet, and reduces the difference in Hcj between the surface and the center of the diffusion magnet. For a magnet with a thickness of not less than 4 μmm, the difference between coercivity H1 at a position on the surface of the magnet and coercivity H2 at a position 2 μmm inside the magnet is not more than 50 kA/m, so that the squareness of the whole magnet is improved, thereby improving temperature resistance of the magnet. In addition, the metal oxide powder selected forms an oxide adhesive layer on the surface of the magnet after heat treatment, which solves the problem of magnets coming into direct contact and adhering together during high-temperature treatment, increases the loading capacity during heat treatment, and facilitates mass production. Moreover, the organic solid powder and the metal oxide powder will not enter the magnet after diffusion, so that the contents of elements C and O in the magnet are not significantly increased.

Compared with the patent CN106158347A, in this patent, the distribution of heavy rare earth RH on the surface of the magnet is improved by alternately adding RL layers. During diffusion, the RL layers effectively reduce the concentration difference of heavy rare earth at the RH layers during diffusion, and prevent excessive rare earth from accumulating on the surface of the magnet and thus entering the main phase of the grain, resulting in a significant decrease in remanence of the magnet. In actual mass production, the sum of the number of RL and RH layers is less than or equal to 5. When excessive layers are alternately disposed, the production cost will be increased on one hand, and on the other hand, the diffusion speed will be reduced due to excessive RL layers, which will lead to the need for longer holding time for diffusion and thus reduce the overall diffusion efficiency. In addition, when the RL layer and the RH layer are alternately disposed, the RL layer disposed at the outermost layer can protect the RH layer from damage, and the RL layer can form an oxide adhesive layer on the surface of the magnet after heat treatment. The oxide adhesive layer can isolate magnets and prevent the magnets from adhering together during high-temperature holding.

After heat treatment, the surface of the sintered magnet has an oxide adhesive layer with a thickness of less than 20 μm, preferably 10 μm. The oxide adhesive layer is easy to clean, for example, the oxide adhesive layer can be cleaned completely by brushing or ultrasonic cleaning, and can be removed completely without relying on mechanical grinding. During diffusion treatment of superimposed magnets, the oxide adhesive layer can isolate the magnets and increase the loading capacity for diffusion. The thickness is preferably not greater than 10 μm, and more preferably not greater than 6 m.

The applicants have found that, on one hand, the metal oxide powder does not react with heavy rare earth RH or reduce activity thereof during high-temperature heat treatment, and on the other hand, the metal oxide powder does not react with the neodymium-iron-boron magnet and does not destroy the surface state of the magnet when in contact with the surface of the magnet at a high temperature. When the granularity of the selected metal oxide powder is larger than 10 μm, due to the contact between magnets during high-temperature diffusion treatment, oversized particles can easily destroy the surface state of the magnets, resulting in the formation of pits on the surfaces of the magnets. The pits need to be ground off during subsequent treatment to ensure the appearance of products, so that the processing cost is increased, and the size of a matrix blank needs to be increased during design, resulting in serious waste. However, when the granularity is less than 0.5 μm, due to the excessively small granularity of the metal oxide powder, the diffusion speed cannot be effectively controlled, and the concentration difference of heavy rare earth contents between the surface and the center of the magnet after diffusion cannot be effectively reduced. In addition, the effect of reducing the adhesion between magnets is reduced when the metal oxide powder is excessively small, and the magnets are easy to adhere together and are not easily separated. When powder with a granularity of 0.5-3 μm accounts for more than 70%, the granularity of the metal oxide powder is slightly smaller than the size of main phase grains of the magnet. Batch verification can achieve effective control of the granularity of the metal oxide powder over the diffusion speed of heavy rare earth on one hand, and on the other hand, because the granularity of the metal oxide powder is slightly smaller than the size of the grains, the metal oxide powder will not hinder the diffusion of heavy rare earth along the grain boundaries on the surfaces of the grains during diffusion, and will not destroy the surface state of the magnet in a high-temperature diffusion environment.

When ethanol is used as the organic solvent in the present disclosure, additional burdens on the tightness, exhaust capacity, safety, and the like of the equipment can be further reduced, increasing the equipment cost.

The composite diffusion layer described in the present disclosure has a total thickness of less than 200 m, preferably 10-100 μm. The thickness of the composite diffusion layer is controlled within a certain range based on the fact that when the thickness is excessively small, the distribution of heavy rare earth is nonuniform, resulting in nonuniform distribution of heavy rare earth elements diffused into the magnet on the entire magnet, and the RL layer disposed on the surface of the magnet has no significant effect in regulating the diffusion concentration, which ultimately leads to poor homogeneity of the magnet. When the thickness is excessively large, on one hand, the composite diffusion layer contains excessive heavy rare earth, the excessive heavy rare earth cannot be completely diffused into the interior of the magnet during heat treatment and will form agglomerates on the surface of the magnet, eroding the surface of the magnet and affecting the surface state of the magnet, and the heavy rare earth accumulated on the surface of the magnet results in a waste of starting materials; and on the other hand, the composite diffusion layer contains excessive organic substances, so that a large amount of organic substances will be removed during heat treatment, which affects the atmosphere in a heat treatment device, results in an increase in elements carbon and oxygen in the magnet, and ultimately affects the performance of the magnet.

At the temperature holding heat treatment stage of the present disclosure, an alternate low-temperature and high-temperature holding process is adopted. The diffusion temperature is relatively single in the general diffusion process, so as to ensure that heavy rare earth disposed on the surface always diffuses into the interior of the magnet with a high concentration gradient, thereby improving the diffusion efficiency. However, if the diffusion treatment is always performed at a relatively single temperature in the actual diffusion process, because the grain boundary channel is fixed, a large amount of heavy rare earth enters the main phase during diffusion, and thus the optimal grain boundary diffusion effect cannot be achieved. Moreover, remanence of the magnet will be obviously reduced when heavy rare earth enters the main phase. Especially for a magnet with a thickness of greater than or equal to 4 μmm, because the thickness of the magnet is relatively large, the diffusion effect will be reduced by simply disposing more heavy rare earth RH layers on the surface at a higher diffusion temperature. The heavy rare earth RH is mostly distributed at the grain boundary near the surface of the magnet, and a large amount of the heavy rare earth penetrates into the main phase, so that the difference in Hcj between the surface and the interior of the magnet is large, and the remanence Br of the magnet is greatly reduced relative to the matrix. In this patent, by alternately disposing RL and RH layers on the surface of the magnet and using an alternate low-temperature and high-temperature holding heat treatment process, at the temperature holding stage for high-temperature heat treatment, the grain boundary is in a fully molten state, so that heavy rare earth RH is driven to diffuse into the grain boundary, and the structure of the RH layers is adjusted through the RL layers to reduce the concentration difference of the RH layers, so as to prevent the RH layers on the surface of the magnet from accumulating on the surface of the magnet at a high temperature and thus resulting in diffusion of RH into the main phase and reduction of the effect of grain boundary diffusion; at the temperature holding stage for low-temperature heat treatment, the RH layers disposed on the surface diffuse into the interior of the magnet at a lower speed, in which case element Nd at the grain boundary is replaced by the RH diffused on the grain boundary, the replaced element Nd on the grain boundary is separated out of the magnet, the elements Tb and Nd are replaced at the grain boundary by reducing RH diffused into the magnet at the temperature holding stage for low-temperature heat treatment, and part of the element Nd is separated out of the magnet, thereby improving the diffusion efficiency, improving the distribution uniformity of RH on the magnet, and facilitating diffusion of RH into the interior of the magnet.

A relatively high diffusion temperature of 870-970° C. is preferred during the setting of a conventional diffusion process. It is believed in the conventional diffusion process that a higher temperature indicates a greater driving force for diffusion, which allows heavy rare earth disposed on the surface of a magnet to be diffused deeper along the magnet. However, during an actual test, for a magnet with a thickness of greater than 4 μmm, because the grain boundary between grains in a diffusion channel is fixed, a relatively high diffusion temperature causes a large amount of heavy rare earth to diffuse into the main phase on one hand, and on the other hand, the accumulation of heavy rare earth on the grain boundary is unfavorable for the diffusion along the grain boundary to the interior of the magnet, resulting in a relatively large increase in Hcj on the surface of the magnet, while the center hinders the diffusion of heavy rare earth along the grain boundary, so that the difference in Hcj between the surface and the interior of the magnet is relatively large. The applicants have found that during temperature holding for the alternate low-temperature and high-temperature heat treatment, the low-temperature heat treatment has a temperature range of 750° C.-830° C., the high-temperature heat treatment has a temperature range of 830° C.-970° C., the time for the low-temperature treatment and high-temperature heat treatment is less than or equal to 5 h, and the time for the temperature holding heat treatment is more than or equal to 8 h. During diffusion in the low-temperature heat treatment, when the holding temperature is lower than 750° C., heavy rare earth RH disposed on the surface of the magnet cannot be effectively diffused due to the excessively low temperature, and when the temperature is higher than 830° C., the diffusion efficiency is excessively high, such that Tb and Nd cannot be fully replaced at the grain boundary, and the diffusion depth of RH is reduced. When the holding temperature is higher than 970° C. during the diffusion in the high-temperature heat treatment, heavy rare earth RH disposed on the surface can directly enter the main phase due to the excessively high temperature, and the effect of grain boundary diffusion cannot be achieved.

Moreover, when the thickness in the orientation direction of the magnet is less than 4 μmm, the performance of the magnet is not significantly improved after the RL layers are disposed on the surface of the magnet and an alternative temperature holding process is used for diffusion. When the thickness of the magnet is greater than 15 μmm, because heavy rare earth elements diffuse to the magnet through a liquid-phase grain boundary during the heat treatment, the diffusion is mainly driven by the concentration difference, and the driving force is small due to the relatively low concentration difference, therefore, the diffusion is a slow process. When the thickness of the magnet is greater than 15 μmm, because the RH and RL layers disposed on the surface of the magnet are relatively thick, the difference in magnetic properties between the surface and the center of the magnet is excessive after the diffusion, and the magnetic properties such as squareness of the magnet are deteriorated, which ultimately affects the temperature resistance of the magnet.

BRIEF DESCRIPTION OF THE DRAWING

The FIGURE shows EPMA analysis at different positions on a sintered magnet according to Example 1.

DETAILED DESCRIPTION

The technical solutions of the present disclosure will be further described in detail with reference to the following specific examples. It should be understood that the following examples are merely exemplary illustrations and explanations of the present disclosure, and should not be construed as limiting the protection scope of the present disclosure.

Unless otherwise stated, the starting materials and reagents used in the following examples are all commercially available products, or can be prepared by using known methods.

A method for analyzing grain boundary phase and main phase structures in the present disclosure is as follows: scanning a fracture of a blank by EPMA, processing a CP image of EPMA by using ImagePRO software, and analyzing the width, the length and the like of the grain boundary.

Example 1

Firstly, a neodymium-iron-boron magnet (R—Fe—B magnet) was provided, and the magnet was processed to form a magnetic sheet. The surface of the magnetic sheet was washed with an acid solution and deionized water, and then dried to obtain a neodymium-iron-boron magnet M1. The magnetic sheet had dimensions of 40 μmm×20 μmm×6 μmm and a dimensional tolerance of ±0.03 mm. The thickness in the orientation direction of the magnet M1 was Z=6 μmm, and components of M1 are shown in the table below.

An RH slurry was prepared from terbium hydride as a heavy rare earth element powder, rosin-modified alkyd resin powder as an organic solid, and ethanol with weight percentages of 60 wt %, 5 wt %, and 35 wt %, respectively. An RL slurry was prepared from zirconium oxide as a metal oxide, rosin-modified alkyd resin powder as an organic solid, and ethanol with weight percentages of 55 wt %, 5 wt %, and 40 wt %, respectively. An RH layer, an RL layer, an RH layer, and an RL layer were sequentially disposed on the surface of the magnet by means of dipping and hot air drying to form a composite diffusion layer, so as to obtain an R—Fe—B magnet blank, where the RH layer had a thickness of 20±5 μm, the RL layer had a thickness of 3±2 μm, and the composite diffusion layer accounted for 1.2±0.2% by weight of the magnet M1.

The treated R—Fe—B magnet blank with the composite diffusion layer described above on the surface was placed in a material box for diffusion temperature holding heat treatment in a heat treatment device. The heat treatment process was in a vacuum state, and heating was started when the vacuum degree was less than or equal to 10 Pa. The diffusion heat treatment process was set as follows:

(1) heating: (50-780) ° C.×100 μmin;

(2) low-temperature diffusion heat treatment: 780° C.×240 μmin;

(3) heating: (780-920) ° C.×30 μmin;

(4) high-temperature diffusion heat treatment: 920° C.×240 μmin;

(5) low-temperature diffusion heat treatment: 780×240 μmin (no heating power output during heat treatment at the stage of cooling to 780° C.);

(6) heating: (780-920) ° C.×30 μmin; and (7) high-temperature diffusion heat treatment: 920° C.×240 μmin.

The diffusion heat treatment was followed by quenching, and after the quenching was finished, the system was heated to 500° C. for aging treatment (the aging treatment refers to a heat treatment process in which alloy workpieces, after solution treatment, cold plastic formation or casting and forging, are placed at a high temperature or kept at room temperature to maintain the variation in performance, shape and size over time). The temperature was held for 4 h, and then the system was quenched again to room temperature to obtain a sintered magnet M2. The R—Fe—B magnet blanks were in a contact arrangement during the heat treatment, and there was no adhesion of the sintered magnets after diffusion. As tested by energy spectroscopy, a zirconium oxide powder adhesive layer with an average thickness of 5 μm was formed on the surface of M2.

The products described above were tested as follows:

TABLE 1

Comparison of overall performance of sintered magnet M2 and magnet M1
Test method: 7 mm × 7 mm × 6 mm samples were taken from the magnet M1 and the magnet M2.
Test equipment: NIM-62000

| Item | Density (g/cm$^3$) | Br (T) | Hcj (kA/m) |
|---|---|---|---|
| M2 | 7.52 | 1.432 | 2029 |
| M1 | 7.51 | 1.443 | 1209 |

TABLE 2

Comparison of Hcj at a position on the surface of sintered magnet M2 and Hcj at a position 2 mm from the surface of the magnet
Test method: As shown in FIG. 1, 1 mm × 1 mm × 1 mm samples were taken from a position on the surface of the sintered magnet M2 and a position 2 mm from the surface, i.e., H1 and H2, respectively. The difference in Hcj between the positions H1 and H2 was 39 kA/m, and EPMA analysis on the element Tb shows that Tb was mainly distributed on the grain boundary in the field of view 1 selected from the position H1, and a large amount of Tb was not found to enter the main phase. The element Tb was obvious on the grain boundary in the field of view 2 selected from the position H2, and the element Tb was distributed uniformly at the grain boundary after diffusion.
Test equipment: PFM06

| Item | Hcj (kA/m) |
|---|---|
| H1 | 2051 |
| H2 | 2012 |

TABLE 3

Comparison of main components of sintered magnet M2 and magnet M1
Test equipment: Spectrometer

| Test item | B | Al | Co | Nd | Pr | Dy | Tb | Cu | Ga | Al | Zr |
|---|---|---|---|---|---|---|---|---|---|---|---|
| Found value of M2, % | 0.97 | 0.17 | 0.81 | 22.32 | 7.24 | \ | 0.87 | 0.12 | 0.1 | 0.16 | 0.12 |
| Found value of M1, % | 0.98 | 0.17 | 0.80 | 22.29 | 7.10 | \ | 0.46 | 0.11 | 0.1 | 0.15 | 0.12 |

Note:
The balance was Fe.

The results described above show that in this way, compared with M1, the remanence Br of M2 was only reduced by about 0.011 T, and Hcj was increased by about 820 kA/m. The component test shows that Tb of M2 was increased by about 0.41 wt % compared with M1.

TABLE 4

Analysis and comparison of contents of elements C and O in sintered magnet M2 and magnet M1
Test equipment: CS analyzer and ONH analyzer

| Item | C (wt %) | O (wt %) |
|---|---|---|
| Found value of M2 | 0.0537 | 0.0914 |
| Found value of M1 | 0.0546 | 0.0891 |

Table 4 shows that, from the analysis and comparison of the contents of elements CSON in the magnets before and after diffusion, the contents of C and O did not show a significant increase, indicating that impurity elements formed by slurries during diffusion did not enter the magnets.

Example 2

Like the neodymium-iron-boron magnet M1 in Example 1, a magnetic sheet formed had dimensions of 40 μmm×30 μmm×8 μmm and a dimensional tolerance of 0.03 μmm, and a composite diffusion layer was disposed on the surface: an RH slurry was prepared from terbium fluoride as a heavy rare earth element powder, rosin-modified alkyd resin powder as an organic solid, and ethanol with weight percentages of 55 wt %, 5 wt %, and 40 wt %, respectively. An RL slurry was prepared from aluminum oxide as a metal oxide, rosin-modified alkyd resin powder as an organic solid, and ethanol with weight percentages of 50 wt %, 6 wt %, and 44 wt %, respectively. An RH layer, an RL layer, an RH layer, and an RL layer were sequentially disposed on the surface of the magnet by means of roll coating and hot air drying to form a composite diffusion layer, so as to obtain an R—Fe—B magnet blank with an oxide on the surface, where the RH layer had a thickness of 25±5 μm, the RL layer had a thickness of 3±2 μm, and the composite diffusion layer accounted for 0.9±0.2% by weight of the magnet M1.

The R—Fe—B magnet blank described above was placed in a material box for diffusion temperature holding heat treatment heat treatment in a heat treatment device. A heating process was set as follows: 50-780° C.×100 μmin+780° C.×180 μmin+780-920° C.×30 μmin+920° C.×240 μmin+780×360 min (no heating power output during the heat treatment)+780-920° C.×30 μmin+920° C.×360 μmin. Quenching was then performed, and after the quenching was finished, the system was heated to 520° C. for aging treatment. The temperature was held for 4 h, and then the system was quenched to room temperature to obtain a magnet M3.

As tested by energy spectroscopy, an aluminum oxide powder adhesive layer was formed on the surface of M3. The R—Fe—B magnet blanks were in a contact arrangement during the heat treatment, and there was no adhesion of the sintered magnets after diffusion.

TABLE 5

Comparison of performance of sintered magnet M3 and magnet M1

| Item | Density (g/cm$^3$) | Br (T) | Hcj (kA/m) |
|---|---|---|---|
| M3 | 7.51 | 1.363 | 2275 |
| M1 | 7.52 | 1.378 | 1407 |

Table 5 shows that in this way, compared with M1, the remanence Br of M3 was only reduced by about 0.015 T, and Hcj was increased by about 868 kA/m.

TABLE 6

Comparison of Hcj at a position on the surface of sintered magnet M3 and Hcj at a position 2 mm from the surface of the magnet
Test method: 1 mm × 1 mm × 1 mm samples were taken from a position on the surface of the sintered magnet M3 and a position 2 mm from the surface, and the difference in Hcj between the positions H1 and H2 was 38 kA/m.
Test equipment: PFM06

| Item | Hcj (kA/m) |
|---|---|
| H1 | 2297 |
| H2 | 2259 |

The exemplary embodiments of the present disclosure have been described above. However, the protection scope of the present disclosure is not limited to the embodiments described above. Any modification, equivalent, improvement, and the like made by those skilled in the art without departing from the spirit and principle of the present disclosure shall fall within the protection scope of the present disclosure.

The invention claimed is:

1. A preparation method of a sintered R—Fe—B magnet, comprising:
   (1) disposing a composite diffusion layer on a surface of an R—Fe—B magnet by coating to form a R—Fe—B magnet blank; and
   (2) performing a temperature holding heat treatment on the R—Fe—B magnet blank in vacuum or in an inert gas atmosphere to obtain a sintered magnet having an oxide adhesive layer on the surface thereof;
   wherein the temperature holding heat treatment comprises alternately performing a low-temperature heat treatment and a high-temperature heat treatment, wherein the low-temperature heat treatment is carried out at a temperature range of 750° C.-830° C., and the high-temperature heat treatment is carried out a temperature range of above 830° C. to 970° C., wherein:
   the R—Fe—B magnet blank comprises the R—Fe—B magnet and the composite diffusion layer disposed on the surface of the R—Fe—B magnet;
   in the R—Fe—B magnet, R stands for one or more rare earth elements selected from Nd, Pr, Tb, Dy, Gd, and Ho;
   in the R—Fe—B magnet, R has a weight percentage of 27 wt %-34 wt % and B has a weight percentage of 0.8 wt %-1.3 wt %;
   the R—Fe—B magnet further comprises M, M being selected from at least one of Ti, V, Cr, Mn, Co, Ga, Cu, Si, Al, Zr, Nb, W, and Mo, and having a weight percentage of less than 5 wt %;
   a thickness of the R—Fe—B magnet in a magnetic orientation thereof is greater than or equal to 3.95 mm;
   the composite diffusion layer comprises one or more RH layers and one or more RL layers that are alternately disposed, each RH layer comprising a heavy rare earth component, a first organic solid, and a first solvent, and each RL layer comprising a metal oxide, a second organic solid, and a second solvent;
   the heavy rare earth component is selected from metal dysprosium, metal terbium, dysprosium hydride, terbium hydride, dysprosium fluoride, terbium fluoride, dysprosium oxide, terbium oxide, and mixtures thereof;
   the metal oxide is selected from zirconium oxide, calcium oxide, aluminum oxide, and holmium oxide, and mixtures thereof,
   the first organic solid and the second organic solid being same or different, independently selected from rosin-modified alkyd resin, thermoplastic phenolic resin, urea-formaldehyde resin, polyvinyl butyral, and mixtures thereof,
   the first solvent and the second solvent being same or different, independent selected from an alcohol solvent, an ether solvent, an aromatic hydrocarbon solvent, and mixtures thereof;
   and
   wherein Hcj of the surface of the sintered R—Fe—B magnet in the magnetic orientation thereof is H1, Hcj at a location 2.00±0.02 mm inside the magnet from the surface of the magnet along the magnetic orientation direction thereof is H2, and the difference between H1 and H2 is not more than 50 kA/m.

2. The preparation method of the sintered R—Fe—B magnet as claimed in claim 1, wherein the disposing the composite diffusion layer by coating comprises alternately coating the surface of the R—Fe—B magnet with a RH layer slurry and a RL layer slurry, and then drying to form the composite diffusion layer.

3. The preparation method of the sintered R—Fe—B magnet as claimed in claim 2, wherein in the RH layer slurry, a mass ratio of the heavy rare earth component, the first organic solid, and the first solvent is (40-70):(3-10):(20-50), respectively; and
   in the RL layer slurry, a mass ratio of the metal oxide, the second organic solid, and the second solvent is (30-70):(3-10):(20-50), respectively.

4. The preparation method of the sintered R—Fe—B magnet as claimed in claim 1, wherein a total time for the temperature holding heat treatment is not less than 8 h.

5. The preparation method of the sintered R—Fe—B magnet as claimed in claim 1, further comprising performing an aging heat treatment after the temperature holding heat treatment, wherein the aging heat treatment comprises quenching to room temperature after the temperature holding heat treatment, then aging at 430° C.-650° C. for 1 h-72 h, and then quenching to room temperature.

6. The preparation method of the sintered R—Fe—B magnet as claimed in claim 1, wherein the temperature holding heat treatment or the aging heat treatment is performed in vacuum or in an inert gas atmosphere.

7. The preparation method of the sintered R—Fe—B magnet as claimed in claim 1, wherein the coating is by brush coating, roll coating, dipping, or spray coating.

8. The preparation method of the sintered R—Fe—B magnet as claimed in claim 1, wherein after the drying, the weight of the R—Fe—B magnet blank is higher by 0.1 wt %-3 wt % compared with that of the R—Fe—B magnet.

9. The preparation method of the sintered R—Fe—B magnet as claimed in claim 2, wherein the RH layer slurry or the RL layer slurry has a solid content of 30 wt %-90 wt %.

10. The preparation method of the sintered R—Fe—B magnet as claimed in claim 2, wherein the coating further comprises coating the surface of the R—Fe—B magnet multiple times with the RH layer slurry, the RL layer slurry, or both.

11. The preparation method of the sintered R—Fe—B magnet as claimed in claim 2, wherein the RL layer slurry comprises 55 wt % zirconium oxide, 5 wt % rosin-modified alkyd resin, and 40 wt % ethanol; and the RH layer slurry comprises 60 wt % terbium fluoride, 5 wt % rosin-modified alkyd resin, and 35 wt % ethanol.

12. The preparation method of the sintered R—Fe—B magnet as claimed in claim 2, wherein the RL layer slurry comprises 50 wt % aluminum oxide, 6 wt % rosin-modified alkyd resin, and 44 wt % ethanol; and the RH layer slurry comprises 55 wt % terbium fluoride, 5 wt % rosin-modified alkyd resin, and 40 wt % ethanol.

13. The preparation method of the sintered R—Fe—B magnet as claimed in claim 1, wherein the oxide adhesive layer has a thickness of less than 20 μm; and
   the oxide adhesive layer comprises at least one metal oxide selected from zirconium oxide, calcium oxide, aluminum oxide, and holmium oxide.

* * * * *